United States Patent
Lu et al.

(10) Patent No.: US 9,224,396 B2
(45) Date of Patent: Dec. 29, 2015

(54) ENHANCED CONTEXT AWARENESS FOR SPEECH RECOGNITION

(75) Inventors: Wenhui Lu, Tampere (FI); Mika Grundström, Tampere (FI)

(73) Assignee: Nokia Technologies Oy, Espoo (FI)

( * ) Notice: Subject to any disclaimer, the term of this patent is extended or adjusted under 35 U.S.C. 154(b) by 359 days.

(21) Appl. No.: 13/701,360

(22) PCT Filed: Jun. 2, 2010

(86) PCT No.: PCT/FI2010/050451
§ 371 (c)(1),
(2), (4) Date: Apr. 8, 2013

(87) PCT Pub. No.: WO2011/151502
PCT Pub. Date: Dec. 8, 2011

(65) Prior Publication Data
US 2013/0204622 A1     Aug. 8, 2013

(51) Int. Cl.
| | | |
|---|---|---|
| *H04M 1/00* | (2006.01) | |
| *G10L 15/22* | (2006.01) | |
| *G06F 3/16* | (2006.01) | |
| *H04M 1/725* | (2006.01) | |
| *G10L 15/08* | (2006.01) | |

(52) U.S. Cl.
CPC .............. *G10L 15/22* (2013.01); *G06F 3/167* (2013.01); *H04M 1/72522* (2013.01); *H04M 1/72597* (2013.01); *G10L 2015/088* (2013.01); *H04M 2250/74* (2013.01)

(58) Field of Classification Search
CPC ...................... H04M 1/72522; H04M 1/72595; H04M 2250/74; H04M 2201/40; G10L 15/22; G10L 2015/088; G10L 15/265; G10L 15/08; G10L 15/063; G10L 15/183; G10L 15/1822; G06F 3/167; G06F 3/16
USPC .................. 704/251, 270, 270.1, 257, 275, 9; 715/255, 863; 707/999.002–999.005, 707/723; 455/563
See application file for complete search history.

(56) References Cited

U.S. PATENT DOCUMENTS

| | | |
|---|---|---|
| 6,400,996 B1 * | 6/2002 | Hoffberg et al. ................. 700/83 |
| 7,103,313 B2 * | 9/2006 | Heinonen et al. ............ 455/41.2 |

(Continued)

FOREIGN PATENT DOCUMENTS

| | | |
|---|---|---|
| WO | WO 2007/054760 A1 | 5/2007 |
| WO | WO 2009/143904 A1 | 12/2009 |

OTHER PUBLICATIONS

International Search Report for Application No. PCT/FI2010/050451 dated Mar. 11, 2011.

(Continued)

*Primary Examiner* — Vijay B Chawan
(74) *Attorney, Agent, or Firm* — Alston & Bird LLP

(57) ABSTRACT

A method comprising establishing a call connection (200) between at least a first and a second terminal; monitoring (202), by at least the first terminal, a conversation during the call in order to detect (204) at least one predetermined context-related keyword repeated in at least the first and the second terminal; and in response to detecting (210) at least one repeated predetermined context-related keyword, providing an indication (212, 214, 216) about the detected context-related keyword to a user of at least the first terminal, said indication enabling opening an application linked to said context-related keyword.

20 Claims, 2 Drawing Sheets

(56) References Cited

U.S. PATENT DOCUMENTS

Figure 1:
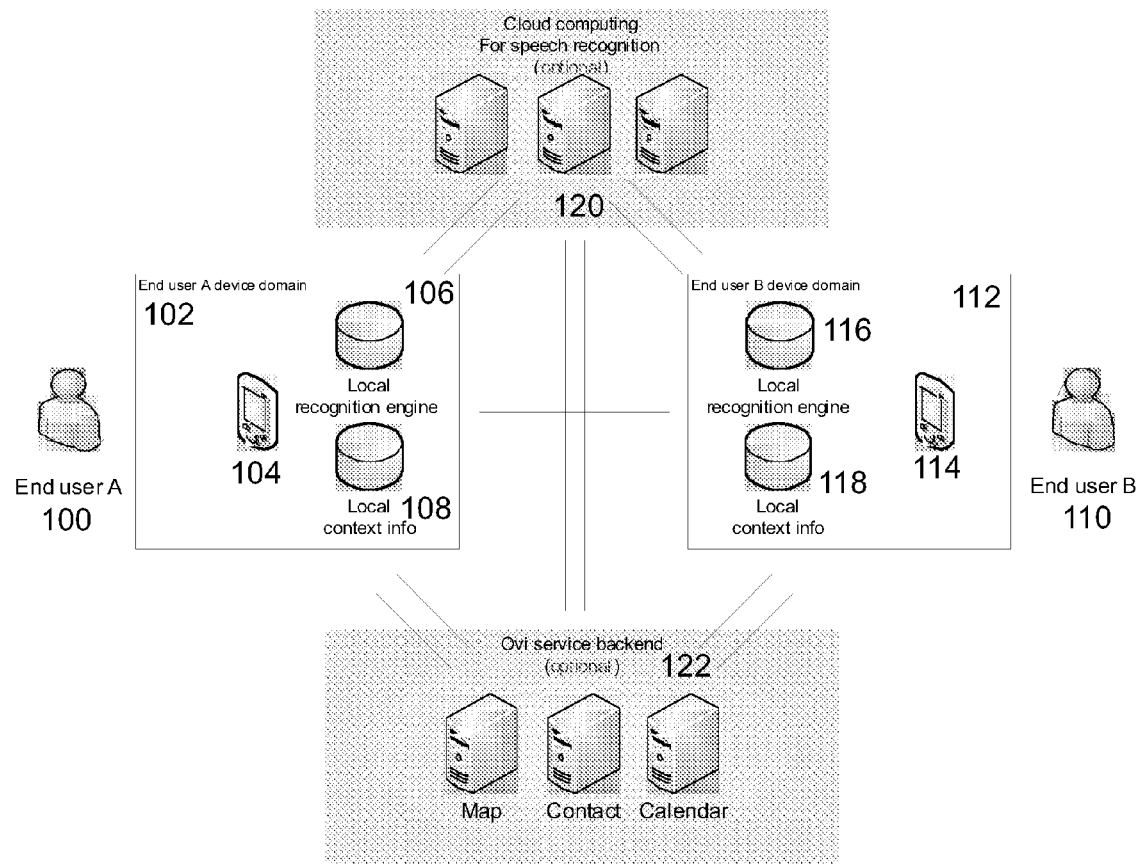

| | | |
|---|---|---|
| 8,654,952 B2 * | 2/2014 | Wang et al. .............. 379/202.01 |
| 2007/0177606 A1 * | 8/2007 | Jabri et al. ................. 370/395.5 |
| 2007/0185859 A1 * | 8/2007 | Flowers et al. ................... 707/5 |
| 2007/0208732 A1 * | 9/2007 | Flowers et al. ................... 707/5 |
| 2007/0249406 A1 * | 10/2007 | Andreasson ................. 455/563 |
| 2008/0016050 A1 * | 1/2008 | Stensmo .......................... 707/4 |
| 2008/0208594 A1 * | 8/2008 | Cross et al. .................. 704/275 |
| 2009/0157653 A1 * | 6/2009 | Herlocker et al. ................ 707/5 |
| 2009/0157729 A1 * | 6/2009 | Herlocker et al. ............ 707/102 |
| 2009/0300657 A1 * | 12/2009 | Kumari .......................... 719/320 |
| 2014/0112458 A1 * | 4/2014 | Wang et al. ................ 379/32.01 |

OTHER PUBLICATIONS

Enronen, A. et al., *Audio-Based Context Recognition*, IEEE Transactions on Audio, Speech and Language Processing, vol. 14, No. 1 (Jan. 2006) 321-329.

* cited by examiner

ENHANCED CONTEXT AWARENESS FOR SPEECH RECOGNITION

FIELD OF THE INVENTION

The present invention relates to speech recognition, and more particularly to providing enhanced context awareness in combination with speech recognition.

BACKGROUND OF THE INVENTION

Speech recognition applications have evolved significantly during recent years. Nowadays the performance enables recognition, which is much faster than real-time human speech, and the accuracy is near to human being level. In many applications, the accuracy is only limited due to the fact the application requires user-specific training data, i.e. the accuracy may be worse for the voice of a non-user.

Various devices, like mobile terminals, include speech recognition applications facilitating the use of the device. For example, there are speech recognition applications, which enable to open a specific application (e.g. a calendar or contacts) by saying aloud known keywords and pressing a certain key of the keypad at the same time.

Currently during the phone conversation, the end users sometimes have to interrupt the conversation, open a new application manually and check some info which is already available on the mobile devices. For example, when making an appointment, the end user needs to check if he/she is available on the proposed date, or the end user needs to check where is the good place to meet for both parties involved in the conversation, or the end user needs to check if he/she has the contact information to involve a third party for the appointment or sending information to him/her.

Thus, despite of the fact that all the required context information such as time, location, and contacts, is already available on the mobile device, the user still have to manually open applications. This is an inconvenient and cumbersome process in terms of the usability of the mobile device.

Accordingly, there is a need for an enhanced method for retrieving the context information easily for the end user during the phone conversation.

SUMMARY OF THE INVENTION

Now there has been invented an improved method and technical equipment implementing the method, in which speech recognition is utilised in retrieving the context information. Various aspects of the invention include a method, an apparatus and a computer program, which are characterized by what is stated in the independent claims. Various embodiments of the invention are disclosed in the dependent claims.

According to a first aspect, there is provided a method comprising: establishing a call connection between at least a first and a second terminal; monitoring, by at least the first terminal, a conversation during the call in order to detect at least one predetermined context-related keyword repeated in at least the first and the second terminal; and in response to detecting at least one repeated predetermined context-related keyword, providing an indication about the detected context-related keyword to a user of at least the first terminal, said indication enabling opening an application linked to said context-related keyword.

According to an embodiment, the method further comprises: monitoring the conversation by a speech recognition application including training data for keywords related to time, a person and/or a location.

According to an embodiment, a predetermined period of time is set for the at least one predetermined context-related keyword to be repeated in at least the first and the second terminal in order for the repetition to be detected.

According to an embodiment, the step of providing an indication about the detected context-related keyword to a user of at least the first terminal comprises at least one of the following:
 starting a calendar application in response to detecting a repeated keyword related to time;
 starting a contact application in response to detecting a repeated keyword related to a person; or
 starting a map application in response to detecting a repeated keyword related to a location.

According to an embodiment, the step of providing an indication about the detected context-related keyword to a user of at least the first terminal comprises providing a user interface notification to the user about the detected context-related keyword, and prompting the user to activate the application linked to said context-related keyword.

According to an embodiment, the method further comprises: comparing the detected context-related keyword to context data stored in connection with at least the first terminal; and mapping the detected context-related keyword to a closest-matching context data in order to obtain explicit information representing said keyword.

According to an embodiment, the method further comprises: sharing at least a part of the context data of the first and the second terminal between each other.

According to an embodiment, the method further comprises: comparing the detected context-related keyword to the shared context data; and in response to noticing that the context data of the first and the second terminal provide different options for mapping the keyword to context data, providing an indication about the different option to a user of at least either of terminals.

According to an embodiment, the method further comprises: sharing the keywords recognised by the first and the second terminal between each other during the call in order to enhance the operation of the speech recognition on the opposite terminal.

According to a second aspect, there is provided an apparatus comprising: means for establishing a call connection to at least a second apparatus; means for monitoring a conversation during the call in order to detect at least one predetermined context-related keyword repeated in both apparatuses; and means for providing an indication about the detected context-related keyword to a user through an application linked to said context-related keyword in response to detecting at least one repeated predetermined context-related keyword.

According to a third aspect, there is provided an apparatus comprising at least one processor and at least one memory storing computer program code, wherein the at least one memory and stored computer program code are configured to, with the at least one processor, cause the apparatus to at least: establish a call connection to at least a second apparatus; monitor a conversation during the call in order to detect at least one predetermined context-related keyword repeated in both apparatuses; and provide an indication, in response to detecting at least one repeated predetermined context-related keyword, about the detected context-related keyword to a user, said indication enabling opening an application linked to said context-related keyword.

According to a fourth aspect, there is provided a system comprising at least a first and a second terminal arranged to establish a call connection between each other; at least the first terminal being arranged to monitor a conversation during the call in order to detect at least one predetermined context-related keyword repeated in at least the first and the second terminal; and in response to detecting at least one repeated predetermined context-related keyword, provide an indication about the detected context-related keyword to a user of at least the first terminal through an application linked to said context-related keyword.

As further aspects of the invention, there are provided computer program products for carrying out the steps of the method in said apparatuses.

These and other aspects of the invention and the embodiments related thereto will become apparent in view of the detailed disclosure of the embodiments further below.

LIST OF DRAWINGS

Figure 3:
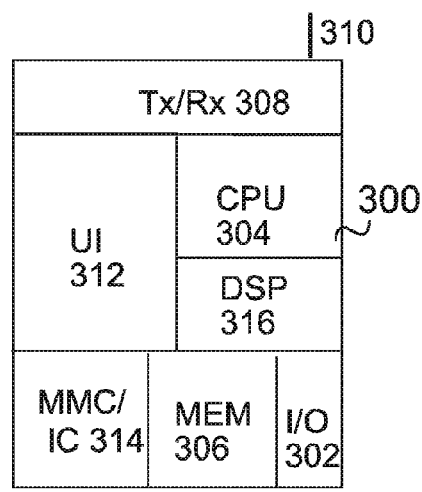
Figure 2:
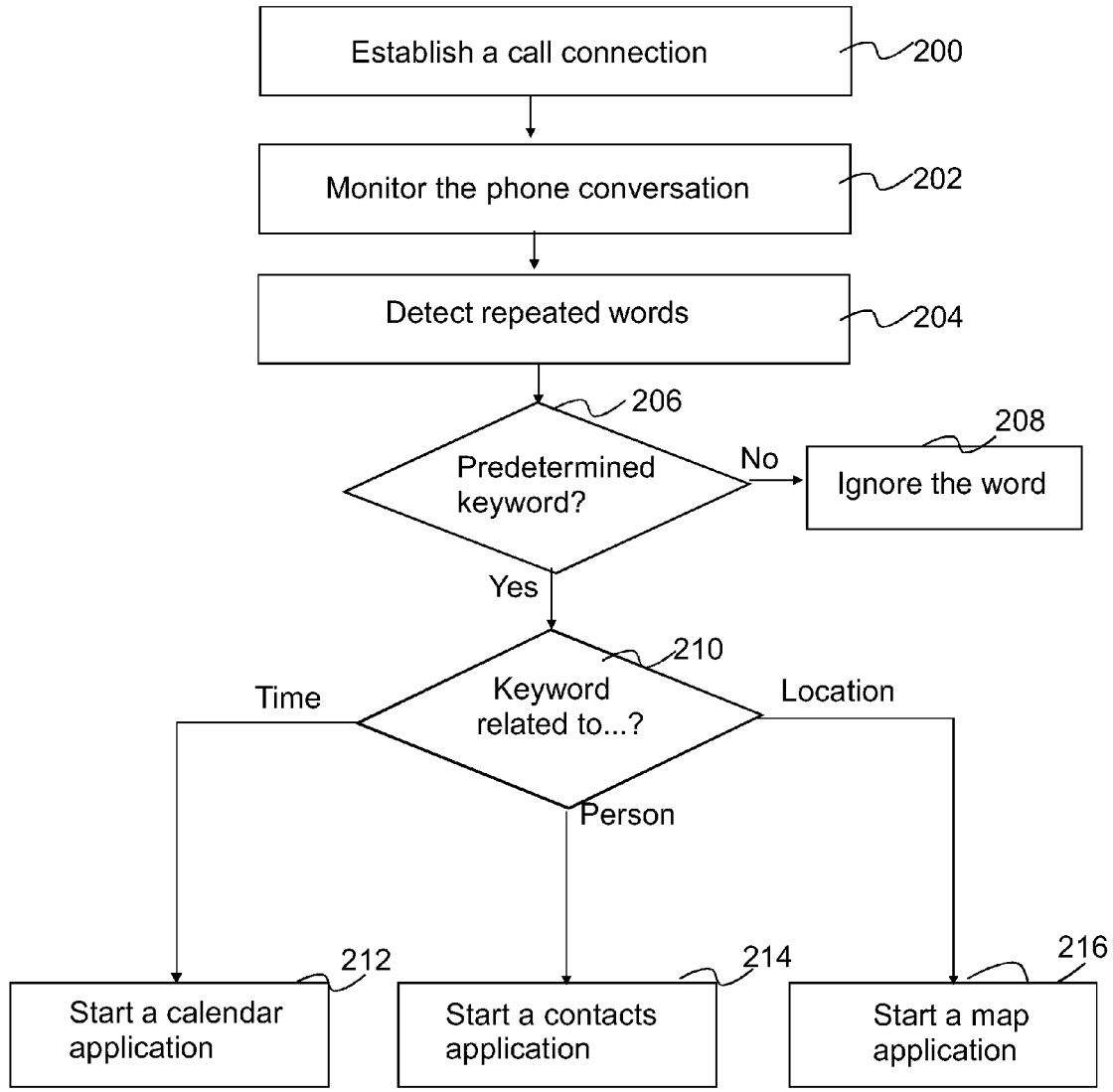

In the following, various embodiments of the invention will be described in more detail with reference to the appended drawings, in which FIG. 1 shows a basic configuration for an enhanced speech recognition system according to the embodiments;

FIG. 2 shows a flow chart of the operation of a call assistant functionality according to various embodiments of the invention; and FIG. 3 shows a simplified structure of an apparatus (TE) capable of operating as a terminal device in the system according to the embodiments.

DESCRIPTION OF EMBODIMENTS

FIG. 1 illustrates a basic configuration for a system architecture, wherein an enhanced speech recognition system for phone conversation is provided. The system is herein referred to as "a collaborative call assistant system". The example illustrated in FIG. 1 shows a phone conversation involving two parties, end user A (100) and end user B (110). It is, however, to be noted that the embodiments described herein below are equally applicable in a conference call involving more than two parties. At least one, but preferably both parties that are involved in the phone conversation (or all parties in case of a conference call) have a call assistant functionality installed within their own device domain.

It is to be noted that even though the embodiments herein are described using a two-party telephone call or a multi-party conference call as examples, the means for establishing the connections for a conversation between the devices is not relevant for the embodiments, but any possible connection type can be used, such as Bluetooth, WIFI, cellular network, cable, etc.

The call assistant functionality is arranged to operate mainly its own device domain (102, 112). The device domain may include a terminal device (104, 114), such as a mobile phone, a PDA (Personal Digital Assistant) device, a (laptop) computer or even a landline telephone. The device domain preferably further includes a local recognition engine (106, 116), either integrated in the terminal device or implemented in a separate device, for carrying out the speech recognition. Furthermore, the device domain preferably includes a local context database (108, 118), either integrated in the terminal device or implemented in a separate device, for storing context data, such as calendar, contacts and location info to be utilised in various context awareness applications.

In addition to its own device domain, the call assistant functionality may be connected to a remote speech recognition engine (120) located in a network. Such a remote speech recognition engine may provide further increase in the processing power available for the speech recognition, thus improving the speed and the accuracy of the speech recognition. In a similar manner, the call assistant functionality may be connected to a network-based context database (122), such as to Ovi® service, which may provide further context data for the context awareness applications. The further context data may comprise e.g. the end user's another (personal) context database or a context data common for both parties of the phone conversation.

According to an embodiment, the call assistant functionalities of the parties involved in the phone conversation are arranged to communicate mutually with each, thereby at least partly sharing their context data for further analysis. It is to be noted that even if the system is described to be symmetrical, it is envisaged that only one party of the phone conversation may have the call assistant functionality, thus allowing one-directional context data sharing. Furthermore, the data shared between the parties can be further shared and analysed locally by a device domain.

Once the call connection has been set up, the devices included in the conversation start to monitor the conversation in order to detect keywords by comparing the detected speech pattern with a set of patterns (i.e. the training data) stored in advance in connection with the speech recognition engine. Another example of an audio content classification is a context recognition engine, which is disclosed more in detail in the publication "Audio-based context recognition", Eronen A et al., IEEE Transactions on audio, speech and language processing, Vol. 14. No 1, January 2006. The context of the speech of each device involved in the conversation can be constantly monitored and classified.

Accordingly, the call assistant functionality has two main purposes. One is to perform the speech recognition by using the local recognition engine and its relevant training data, optionally with the help of the remote speech recognition engine in the network. Another purpose is to collaborate with the counter device(s) to retrieve meaningful real-time context data suitable for the end user himself/herself or suitable for both/all parties during the conversation. The context data could include time, location, contacts, etc. which are available for the end user to smooth the phone conversation, or to promote further actions, like sending contacts to the caller, make an appointment with the caller, etc.

According to an embodiment, the call assistant functionality is arranged to recognise content-related keywords, which are repeated within a short time by at least two parties during the phone conversation. The length of the period during which the keywords repeated by the parties are recognised may be determined e.g. in the settings of the call assistant functionality. The call assistant functionality may also collect statistical data on the user behaviour during phone calls, e.g. the speed of speech, and then automatically adjust the length of the period appropriately. It should be noted that the call assistant functionality should preferably define a maximum value for said period in order to keep the performance of the system meaningful.

The repeated keywords to be recognised are stored in the training data of the speech recognition engine, thus forming a predefined set of keywords, and they are preferably relevant to time, location, or contacts, whereas other repeated words are ignored. Thus, effective content-related speech recognition can be achieved with a rather limited set of keywords. The suitable number of the keywords to be used depends e.g. on the user behaviour during phone calls, as well as on the processing power available on the terminal device. Naturally, as more powerful terminal devices appear on the market in the future, the number of suitable keywords to be used will also increase significantly. The call assistant functionality may also provide the user with a possibility to easily add his/her own keywords to the predefined set of keywords.

According to an embodiment, in response to recognising a content-related keyword, the call assistant functionality is arranged to start an application related to said keyword in the terminal device. For example, a keyword related to time may trigger a calendar application, a keyword related to location may display a map of the area in question, etc. For example, when the expression "tomorrow" is recognised as a repeated keyword, both end users could see a calendar view of the next day on their terminal device's display. Consequently, the end user may more intuitively verify the significance of the keyword to his/her own content data and start further actions, if considered necessary. According to an embodiment, the call assistant functionality is arranged to convert relative content information into explicit information. During the conversation, end users tend to use a lot of relative information for time, contact, and location in their speech. For temporal expressions, it is quite typical to use "tomorrow", "next weekend", "last Thursday", "valentine's day this year", "two days before Christmas Eve", "in one hour" etc. Now the call assistant functionality is arranged to recognise those expressions, compare the relative time information to the present exact time information and convert the relative time into absolute time like "2 p.m., 2 Jan. 2010". Then the call assistant functionality may open the calendar application on that particular date in order for the end user to check his/her availability on that day, for example.

Regarding the location information, the relative information could be e.g. "the movie theatre next to the university", "2 km's away from my home", "next bus stop for Line 3", "left corner of the central park", "the cafe on the way to your place" etc. The terminal device is arranged to define its location, for example using the GPS (Global Positioning System) navigation system or a cell-based positioning system, and if the terminal device has map information available, either locally stored or available remotely on a service backend, the terminal device can then transform the relative location to an explicit geographical location, such as coordinates or a landmark. Then the explicit location information could be, for example, brought on the display of the terminal device e.g. in a form of a map.

The transformation of the relative location to the explicit location can be further enhanced by sharing the location information between the participants of the phone conversation, whereby at least one terminal device knows where the end users are. Thus, a map could be arranged to show the locations of all end users, or e.g. a preferred route between the end users.

For contacts, the relative information could be expressions like "Lisa we both know", "Adam's phone number", "your email", "my facebook account", "my brother in law", "Tom who lives next to me", "The girl we met last weekend", etc. The device domain of each end user typically includes personal contact database of the end user, but in addition personal relationships to other persons may be available through various online services, events information may be available from the calendar application, social community services, etc. By using the necessary information, the device domain may then map the relative contact to absolute contact information of a person. Thereafter, further actions, such as sending the contact of the person in question to the caller, may be promoted by the device.

The above embodiments are further illustrated by a flow chart of FIG. 2, which describes the operation of the call assistant functionality from the viewpoint of one end user. In the beginning, a call connection is established (200) between at least two parties, and in response to establishing the call connection, the call assistant functionality starts to monitor (202) the phone conversation in order to detect (204) words repeated by at least two different parties of the conversation.

When a word repeated by at least two different parties of the conversation is detected, it is checked (206) from the training data of the speech recognition engine, whether the repeated word belongs to content-related keywords. If not, the word is ignored (208) by the call assistant functionality. However, if the repeated word belongs to content-related keywords, then it is checked (210) whether the keyword is related to time, a person or a location.

If the keyword is related to time, then the call assistant functionality is arranged to either prompt the end user to start a calendar application or automatically start the calendar application (212) on the terminal device, preferably by displaying a calendar view including the date deduced from the time-related keyword. The call assistant functionality preferably comprises a setting for the end user to adjust the response to a detected keyword. Thus, the setting may provide options for the end user either to automatically open the related application, or alternatively submit a user interface (UI) notification, e.g. a sound or a display notification, to notify the end user about the detection of some type of a keyword. Then further action, such as opening the related application, can be triggered e.g. with a simple UI interaction, such as touching on the display screen.

In a similar manner, if the keyword is related to a person, then the call assistant functionality is arranged to, depending on the settings of the call assistant functionality, either prompt the user to start or automatically start a contact application (214) on the terminal device, preferably by displaying all contact data for all persons possibly mapping to the information deduced from the person-related keyword. Finally, if the keyword is related to a location, then the call assistant functionality is arranged to, again depending on the settings of the call assistant functionality, either prompt the user to start or automatically start e.g. a map application (216) on the terminal device, preferably by displaying an explicit location, such as a map, coordinates or a landmark, deduced from the location-related keyword.

It is naturally possible that the relative context information described above may be mapped to different explicit information, if and when the end users' context data differ from each other. For example, the end user A may have three persons having "Lisa" as the first name in his/her contact database, while the end user B only has one "Lisa" in his/her contact database. In this case, the call assistant functionality on the end user's A side would show just one "Lisa", while the end user B could see three different "Lisa" on the screen. Then the end user B would have to confirm that this is the "Lisa" the end user A was talking about.

For alleviating this problem, an embodiment proposes collaboration between the parties to address the possible misunderstanding and to help the end users to verify the differences during the phone conversation. Accordingly, in the above-described case, the call assistant functionality is arranged to compare the shared context data and upon noticing a plurality of options for the identified keyword, the call assistant functionality is arranged to remind the end user A that "Lisa" may refer to a different person than it does for the end user B. In similar manner, when comparing the shared context data, if the call assistant functionality notices a discrepancy in the context data of the end users, it will remind the end user to verify the correctness of the information. For example, if the phone conversation recites "Lisa's birthday", and the end users A and B have different dates stored in their context data as Lisa's birthday, then the call assistant functionality is arranged to remind at least either of, preferably both, end users that there is a difference about the information between the end users' context data. An example relating to location information could be a confusion caused by an expression like "my home" in a situation, where the end user A has just recently moved to a new address and the end user B may still have the old address of the end user stored in the context data. Again, the call assistant functionality is arranged to remind the end users about the difference.

According to an embodiment, the communication between the parties via the call assistant functionalities also includes observing the performance of the speech recognition on the other parties and, if necessary, sharing the recognised keyword. For example, due to the limitation of end user A's speech recognition, a keyword may not be recognised, but it could be recognised by the end user B. Then the end user B's device could immediately send the recognised keyword, e.g. using an IP-based data exchange procedure, to the party that missed the keyword. Accordingly, if it is noticed that a certain keyword is not recognised on both side, the call assistant functionalities are arranged to check if the missing recognition of the keyword is due to the poor performance of speech recognition or the lack of training data. In both case, exchanging data among the call assistant functionalities will improve the performance.

According to a further embodiment, the call assistant functionalities are arranged to mutually correct erroneously interpreted keywords with the help of the counter party. For example, an end user having the training data of the speech recognition engine in Finnish may interpret "Lisa" spoken in the conversation as "Liisa", while another end user having the training data of the speech recognition engine in English would probably interpret it as "Lisa". From the shared context data, the call assistant functionality of said another end user may recognise the erroneously interpreted keyword, and correct the keyword automatically for first end user remotely.

A skilled man appreciates that any of the embodiments described above may be implemented as a combination with one or more of the other embodiments, unless there is explicitly or implicitly stated that certain embodiments are only alternatives to each other.

FIG. 3 illustrates a simplified structure of an apparatus (300) capable of operating as a terminal device in the system according to the invention. The apparatus can be, for example, a mobile terminal, a MP3 player, a PDA device, a laptop computer (PC) or any other data processing device. The apparatus (300) comprises I/O means (I/O; 302), a central processing unit (CPU; 304) and memory (MEM; 306). The memory (MEM; 306) comprises a read-only memory ROM portion and a rewriteable portion, such as a random access memory RAM and FLASH memory. The information used to communicate with different external parties, e.g. a CD-ROM, other devices and the user, is transmitted through the I/O means (I/O; 302) to/from the central processing unit (CPU; 304). If the apparatus is implemented as a mobile station, it typically includes a transceiver Tx/Rx (308), which communicates with the wireless network, typically with a base transceiver station (BTS) through an antenna (310). User Interface (UI; 312) equipment typically includes a display, a keypad, a microphone, loudspeaker and connecting means for headphones. The apparatus may further comprise connecting means (MMC/IC; 314), such as a standard form slot for various hardware modules, or for integrated circuits IC, which may provide various applications to be run in the apparatus.

Accordingly, the call assistant functionality according to the invention may be executed in a central processing unit CPU or in a dedicated digital signal processor (DSP; 316) of the apparatus. The apparatus utilizes the wireless communication means, i.e. the transceiver Tx/Rx and the CPU, to establish call connections to the other parties. The apparatus comprises, or it is functionally connected to, a local speech recognition engine, which is executed by the CPU in order to monitor a conversation during the call in order to detect repeated predetermined context-related keywords. Then, in response to detecting at least one repeated predetermined context-related keyword, the CPU provides an indication about the detected context-related keyword to a user by starting an execution of an application linked to said context-related keyword, and preferably by opening an application window on the display of the apparatus.

The functionalities of the embodiments may be implemented in an apparatus, such as a mobile terminal, also as a computer program which, when executed in a central processing unit CPU or in a dedicated digital signal processor DSP, affects the terminal device to implement procedures of the invention. Functions of the computer program SW may be distributed to several separate program components communicating with one another. The computer software may be stored into any memory means, such as the hard disk of a PC or a CD-ROM disc, from where it can be loaded into the memory of mobile terminal. Alternatively, the apparatus may download an installation package of the software first into a local memory medium, such as a flash memory, and then the apparatus installs the computer program by executing the installation package. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC (Application-Specific Integrated Circuits) or FPGA (Field-Programmable Gate Array) circuits, in a hardware module comprising connecting means for connecting the module to an electronic device, or as one or more integrated circuits IC, the hardware module or the ICs further including various means for performing said program code tasks, said means being implemented as hardware and/or software.

It is obvious that the present invention is not limited solely to the above-presented embodiments, but it can be modified within the scope of the appended claims.

The invention claimed is:

1. A method comprising:
   establishing a call connection between at least a first and a second terminal;
   monitoring, by at least the first terminal, a conversation during the call in order to detect at least one predetermined context-related keyword received in one of the first or the second terminal and repeated in the other of the first or the second terminal; and
   in response to detecting at least one repeated predetermined context-related keyword, providing an indication about the detected context-related keyword to a user of at least the first terminal, said indication enabling opening an application linked to said context-related keyword.

2. The method according to claim 1, further comprising:
   monitoring the conversation by a speech recognition application including training data for keywords related to time, a person and/or a location.

3. The method according to claim 1, wherein
a predetermined period of time is set for the at least one predetermined context-related keyword to be repeated in at least the first and the second terminal in order for the repetition to be detected.

4. The method according to claim 1, wherein the step of providing an indication about the detected context-related keyword to a user of at least the first terminal comprises at least one of the following:
  starting a calendar application in response to detecting a repeated keyword related to time;
  starting a contact application in response to detecting a repeated keyword related to a person; or
  starting a map application in response to detecting a repeated keyword related to a location.

5. The method according to claim 1, wherein the step of providing an indication about the detected context-related keyword to a user of at least the first terminal comprises
  providing a user interface notification to the user about the detected context-related keyword, and
  prompting the user to activate the application linked to said context-related keyword.

6. The method according to claim 1, further comprising:
  comparing the detected context-related keyword to context data stored in connection with at least the first terminal; and
  mapping the detected context-related keyword to a closest-matching context data in order to obtain explicit information representing said keyword.

7. The method according to claim 1, further comprising:
  sharing at least a part of the context data of the first and the second terminal between each other.

8. The method according to claim 7, further comprising:
  comparing the detected context-related keyword to the shared context data; and
  in response to noticing that the context data of the first and the second terminal provide different options for mapping the keyword to context data, providing an indication about the different option to a user of at least either of terminals.

9. The method according to claim 1, further comprising:
  sharing the keywords recognised by the first and the second terminal between each other during the call in order to enhance the operation of the speech recognition on the opposite terminal.

10. An apparatus comprising at least one processor and at least one memory storing computer program code, wherein the at least one memory and stored computer program code are configured to, with the at least one processor, cause the apparatus to at least:
  establish a call connection to at least a second apparatus;
  monitor a conversation during the call in order to detect at least one predetermined context-related keyword received in one of the first or the second apparatus and repeated in the other of the first or the second apparatus; and
  provide an indication, in response to detecting at least one repeated predetermined context-related keyword, about the detected context-related keyword to a user, said indication enabling opening an application linked to said context-related keyword.

11. The apparatus according to claim 10, wherein the at least one memory and stored computer program code are further configured to, with the at least one processor, cause the apparatus to:
  monitor the conversation by a speech recognition application including training data for keywords related to time, a person and/or a location.

12. The apparatus according to claim 10, wherein the at least one memory and stored computer program code are further configured to, with the at least one processor, cause the apparatus to:
  set a predetermined period of time for the at least one predetermined context-related keyword to be repeated in at least the first and the second terminal in order for the repetition to be detected.

13. The apparatus according to claim 10, wherein the at least one memory and stored computer program code are further configured to, with the at least one processor, cause the apparatus, in response to detecting at least one repeated predetermined context-related keyword, to carry out at least one of the following:
  start a calendar application in response to detecting a repeated keyword related to time;
  start a contact application in response to detecting a repeated keyword related to a person; or
  start a map application in response to detecting a repeated keyword related to a location.

14. The apparatus according to claim 10, wherein the at least one memory and stored computer program code are further configured to, with the at least one processor, cause the apparatus, in response to detecting at least one repeated predetermined context-related keyword, to
  provide a user interface notification to the user about the detected context-related keyword, and
  prompt the user to activate the application linked to said context-related keyword.

15. A system comprising:
  at least a first and a second terminal arranged to establish a call connection between each other;
  at least the first terminal being arranged to monitor a conversation during the call in order to detect at least one predetermined context-related keyword received in one of the first or the second terminal and repeated in the other of the first or the second terminal; and
  in response to detecting at least one repeated predetermined context-related keyword, provide an indication about the detected context-related keyword to a user of at least the first terminal, said indication enabling opening an application linked to said context-related keyword.

16. A non-transitory computer program product, stored on a computer readable medium and executable in a data processing device, the computer program product comprising:
  a computer program code section for establishing a call connection to at least a second apparatus;
  a computer program code section for monitoring a conversation during the call in order to detect at least one predetermined context-related keyword received in one of the first or the second apparatus and repeated in the other of the first or the second apparatus; and
  a computer program code section for providing an indication, in response to detecting at least one repeated predetermined context-related keyword, about the detected context-related keyword to a user, said indication enabling opening an application linked to said context-related keyword.

17. The computer program product according to claim 16, further comprising:

a computer program code section for carrying out speech recognition, wherein training data for keywords related to time, a person and/or a location is arranged to be monitored.

18. The computer program product according to claim 16, wherein
a computer program code section for setting a predetermined period of time for the at least one predetermined context-related keyword to be repeated in at least the first and the second terminal in order for the repetition to be detected.

19. The computer program product according to claim 16, further comprising
a computer program code section, responsive to detecting at least one repeated predetermined context-related keyword, for carrying out at least one of the following:
  start a calendar application in response to detecting a repeated keyword related to time;
  start a contact application in response to detecting a repeated keyword related to a person; or
  start a map application in response to detecting a repeated keyword related to a location.

20. The computer program product according to claim 16, further comprising
a computer program code section, responsive to detecting at least one repeated predetermined context-related keyword, for providing a user interface notification to the user about the detected context-related keyword, and prompting the user to activate the application linked to said context-related keyword.

* * * * *